United States Patent [19]

Kang

[11] Patent Number: 5,548,450
[45] Date of Patent: Aug. 20, 1996

[54] DEVICE FOR ADJUSTING AIR GAP BETWEEN LENSES

[75] Inventor: Geon-mo Kang, Kyeongsangnam-do, Rep. of Korea

[73] Assignee: Samsung Aerospace Industries, Ltd., Kyeongsangnam-do, Rep. of Korea

[21] Appl. No.: 360,287

[22] Filed: Dec. 21, 1994

[30] Foreign Application Priority Data

Dec. 22, 1993 [KR] Rep. of Korea .................. 93-29032

[51] Int. Cl.$^6$ .................................................. G02B 07/02
[52] U.S. Cl. ............................................ 359/822; 359/823
[58] Field of Search ............................ 359/822, 823, 359/811, 819, 818, 892, 507, 829

[56] References Cited

U.S. PATENT DOCUMENTS

| | | | |
|---|---|---|---|
| 2,905,054 | 9/1959 | Logan | 359/819 |
| 3,402,003 | 9/1968 | Mc Farland | 359/819 |
| 4,431,267 | 2/1984 | Finck | 359/819 |
| 5,161,061 | 11/1992 | Ihara | 359/811 |
| 5,177,641 | 1/1993 | Kobayashi | 359/820 |
| 5,262,900 | 11/1993 | Gerber | 359/819 |

Primary Examiner—Georgia Y. Epps
Assistant Examiner—Ricky Mack
Attorney, Agent, or Firm—Finnegan, Henderson, Farabow, Garrett & Dunner, L.L.P.

[57] ABSTRACT

A device for adjusting an air gap between lenses having a lens barrel. First and second lenses are disposed within the lens barrel, a spring provided within the lens barrel between the first and second lenses maintains the air gap between the first and second lenses, and a retainer is screw jointed to the lens barrel. The spring is compressed or expanded by tightening or loosening the retainer with respect to the lens barrel. The air gap between lenses can be adjusted to improve the lens performance and the focusing characteristic without dismantling the lenses from the lens barrel.

4 Claims, 2 Drawing Sheets

DEVICE FOR ADJUSTING AIR GAP BETWEEN LENSES

BACKGROUND OF THE INVENTION

1. Field of the Invention

The present invention relates to a device for adjusting an air gap between lenses, and, more particularly, to a device for adjusting the air gap between lenses to improve the lens performance and the focusing characteristic without dismantling the lenses from a lens barrel.

2. Description of the Related Art

The lens system of a conventional camera is constructed by combining several lenses made of various optical glasses having different dispersion coefficients and refractive powers. When the lenses are correctly arranged within the lens barrel, the lens system can produce a clear, regular, sharp and bright image. Therefore the air gap i.e., the interval between the lenses is an important parameter which influences the performance of the lens system, including changing the position of the image plane within the optical system, etc.

The second lens group of a zoom lens system having two lens groups or the third group of a zoom lens system having three lens groups is normally referred to as a compensator. A change in the air gap within the compensator, for example, will influence the back focus distance at a telephoto position and, therefore, deteriorate the performance of the zoom lens system. For example, in a zoom lens for a lens shutter camera having a high magnification, such a change in the air gap within the compensator will affect the back focus distance. That is to say, a change in the air gap within the compensator will change the back focus distance fifteen times at the telephoto position in a zoom lens having two times magnification and about thirty times in a zoom lens having three times magnification. If the normal tolerance of the air gap within the compensator is ±0.05 mm, the tolerance of the back focus distance becomes ±0.75 mm for the zoom lens having two times magnification and ±1.50 mm for the zoom lens having three times magnification.

Under these circumstances, investigations are performed on how to minimize the tolerance of the air gap between the lenses. Known methods for maintaining the air gap between lenses include: making peripheral edges of the lenses contact each other outside of the effective diameter of the lenses; making centering surfaces of concave lenses contact each other in face-to-face contact; placing a space adjusting member such as a spacer or ring between the lenses; and forming the shape of the lens barrel properly.

FIG. 5 shows a conventional device for adjusting the air gap having a spacer disposed between lenses. Three lenses 52, 54 and 56 are arranged within a lens barrel 50 and fastened by means of a retainer 58. The air gap between the lenses 52 and 54 is maintained by inserting an annular spacer 60 of a predetermined thickness between them. Examples of normally used spacers 60 are shown in FIGS. 6 and 7. Because it is difficult to compensate for the tolerance of the air gap between the lenses during the process of assembling the lens barrel, the spacing may not be exactly correct. If the spacing error is too great to be overcome by a focusing process, the lenses must be dismantled from and assembled back to the lens barrel in order to replace the spacer 60 with another spacer of different thickness. This inconvenient procedure results in a low productivity. And also, because only spacers of definite thickness are available, it is not always possible to adjust the air gap to an optimum value. Thus, the change of the back focus distance may go beyond the tolerance limit, deteriorating lens performance.

SUMMARY OF THE INVENTION

The present invention overcomes the problems and disadvantages of the conventional art by providing a device for adjusting an air gap between lenses whereby the air gap between the lenses can be adjusted to an optimum value from outside the lens barrel without dismantling the lenses from the lens barrel to improve the lens performance and make precise focusing possible.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

To achieve the objects and in accordance with the purpose of the invention, as embodied and broadly described herein, the invention comprises a device for adjusting an air gap between lenses comprising a lens barrel, first and second lenses disposed within the lens barrel, an elastic means provided within the lens barrel between the first and second lenses for maintaining the width of an air gap between the first and second lenses, and a retainer which is screw jointed to the lens barrel. The elastic means is compressed or expanded by respectively tightening or loosening the retainer with respect to the lens barrel.

A compression spring, a leaf spring, or an elastic protrusion formed integral with the lens barrel may be used as the elastic means.

BRIEF DESCRIPTION OF THE DRAWINGS

Details of the present invention will be set forth in the description which follows with reference to the accompanying drawings. The drawings, which are incorporated in and constitute a part of this specification, illustrate preferred embodiments of the invention and together with the description, serve to explain the principles of the invention. In the drawings.

DESCRIPTION OF THE PREFERRED EMBODIMENT

Reference will now be made in detail to preferred embodiments of the present invention, examples of which are illustrated in the accompanying drawings. Wherever possible, the same reference numbers will be used throughout the drawings to refer to the same or like parts.

Figure 1:
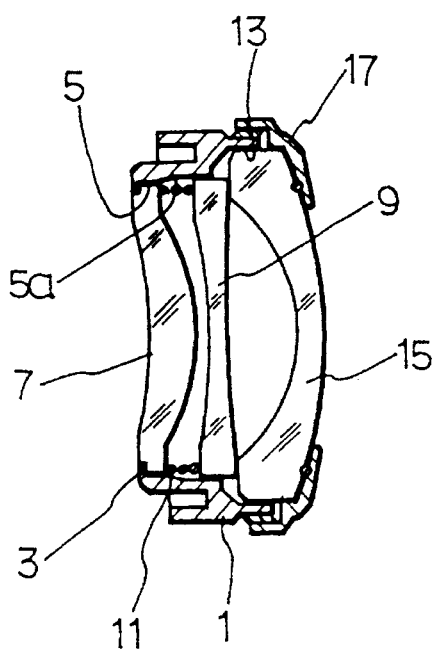
FIG. 1 is a sectional side elevation of a device for adjusting an air gap between lenses according to a first embodiment of the present invention.

In the first embodiment shown in FIG. 1, a device for adjusting an air gap between lenses includes lens barrel 1 having an annular flange 3. Within the lens barrel 1, first and second lenses 7 and 9 are disposed on a small diameter portion 5 and a rear portion 5a, respectively. A compression spring 11 is disposed between the first and second lenses 7 and 9. Next to the second lens 9, a third lens 15 is disposed on a large diameter portion 13 abutting the second lens 9. A retainer 17 is screw mounted to the lens barrel 1 to confine the lenses within the lens barrel 1 between the annular flange 3 and the retainer 17. Because the lenses 9 and 15 are biased by the spring 11 acting against the retainer 17, the air gap i.e., the distance between the first and second lenses 7 and 9 can be adjusted to an optimum value by tightening or loosening the retainer 17.

Figure 2:
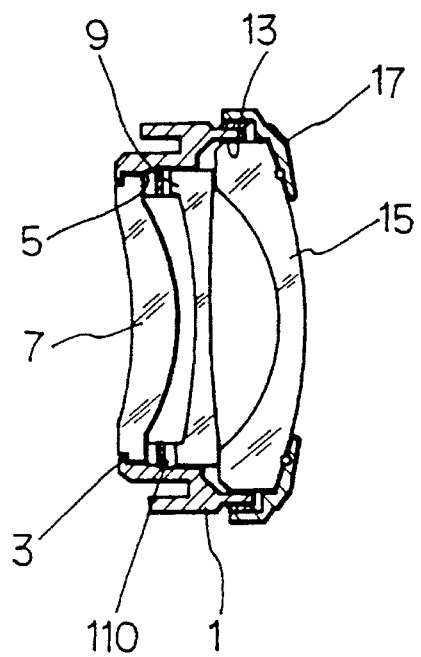
FIG. 2 is a sectional side elevation of a device for adjusting the air gap between lenses according to a second embodiment of the present invention.
Figure 3A:
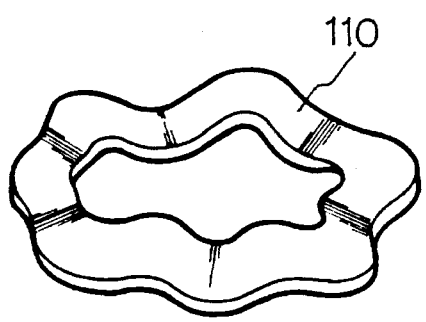
FIGS. 3A and 3B are perspective views of springs which can be used in the device of FIG. 2.
Figure 3B:
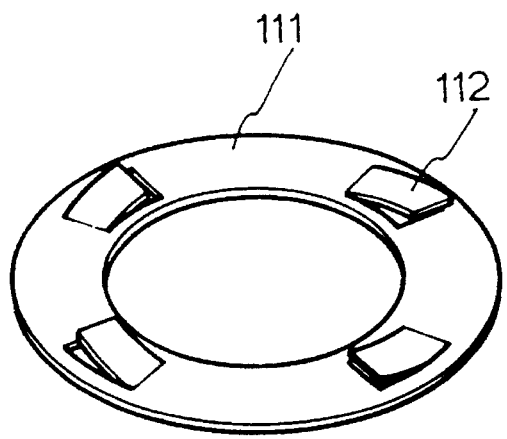
Figure 5:
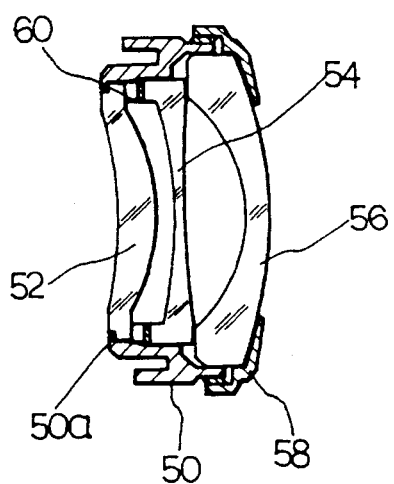
FIG. 5 is a sectional side elevation of a prior art device for adjusting the air gap between lenses.

FIG. 2 shows the second embodiment wherein a leaf spring 110 is disposed between the first and second lenses 7 and 9. This leaf spring 110 can take the shape of a corrugated ring as illustrated in FIG. 3A. FIG. 3B shows another example of the leaf spring having a base ring 111 and a plurality of elastic folds 112.

Figure 4A:
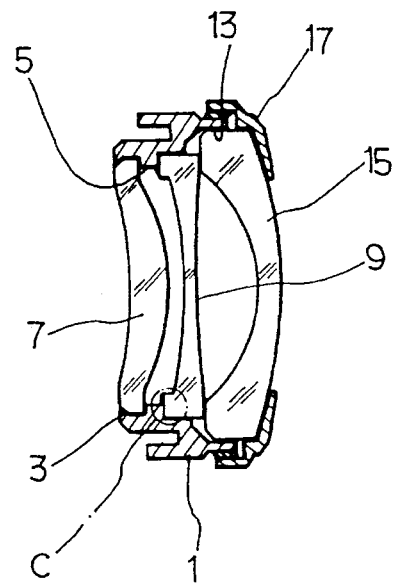
FIG. 4A is a sectional side elevation of a device for adjusting the air gap between lenses according to a third embodiment of the present invention.
Figure 4B:
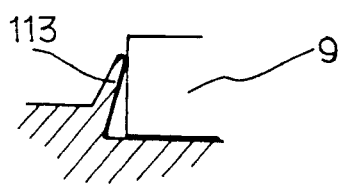
FIGS. 4B and 4C are enlarged views of part C shown in FIG. 4A.
Figure 4C:
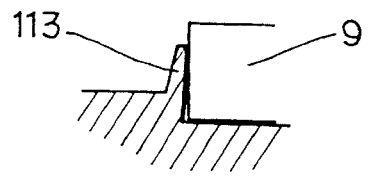
Figure 6:
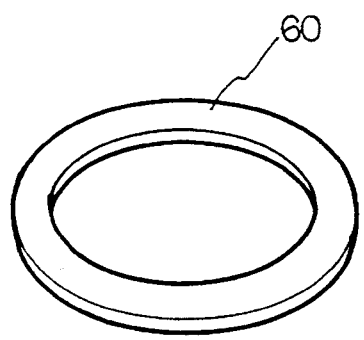
FIGS. 6 and 7 are perspective views of spacers used in the prior art device of FIG. 5.
Figure 7:
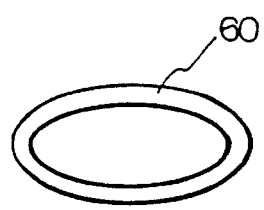

Referring to FIGS. 4A, 4B and 4C showing a third embodiment, an elastic protrusion 113 is formed integral with the lens barrel 1. In this embodiment, the second and third lenses 9 and 15 are biased by the elastic protrusion 113 acting against the retainer 17. FIGS. 4B and 4C show states of the elastic protrusion 113 before and after the lenses 9 and 15 are tightened by the retainer 17, respectively.

As explained and illustrated above, in accordance with the present invention, the air gap between lenses can be adjusted to an optimum value without dismantling the lenses from the lens barrel. Therefore, by adopting the device according to the present invention, workability of adjusting the air gap between the lenses is improved, the tolerance of back focus distance can be minimized particularly in case of zooming lenses having two or three times magnifications such that the lens performance can be improved, and the lens can be focused more precisely.

Other embodiments of the invention will be apparent to one skilled in the art from consideration of the specification and practice of the invention disclosed herein. It is intended that the specification and examples be considered as exemplary only, with the true scope and spirit of the invention being indicated by the following claims.

What is claimed is:

1. A device for adjusting an air gap between lenses, comprising:

a lens barrel;

first and second lenses within the lens barrel;

an elastic means within the lens barrel between the first and second lenses for maintaining an air gap between the first and second lenses; and a retainer attachable to the lens barrel, the elastic means being compressed or expanded by tightening or loosening the retainer with respect to the lens barrel to adjust the air gap between the first and second lenses to an optimum value.

2. The device as claimed in claim 1 wherein the elastic means includes a compression spring.

3. The device as claimed in claim 1 wherein the elastic means includes a leaf spring.

4. The device as claimed in claim 1 wherein the elastic means includes an elastic protrusion integral with the lens barrel.

* * * * *